(12) United States Patent
Li et al.

(10) Patent No.: US 11,833,000 B2
(45) Date of Patent: Dec. 5, 2023

(54) FLUID-DRIVEN MEDICAL OR DENTAL HANDHELD DEVICE

(71) Applicant: Beyes Dental Canada Inc., Toronto (CA)

(72) Inventors: Min Li, Guangzhou (CN); Hua Yang, Toronto (CA)

(73) Assignee: BEYES DENTAL CANADA INC., Toronto (CA)

( * ) Notice: Subject to any disclaimer, the term of this patent is extended or adjusted under 35 U.S.C. 154(b) by 206 days.

(21) Appl. No.: 17/134,218

(22) Filed: Dec. 25, 2020

(65) Prior Publication Data

US 2021/0386510 A1    Dec. 16, 2021

(30) Foreign Application Priority Data

Jun. 16, 2020  (CN) .......................... 202010550154.3
Sep. 9, 2020   (CN) .......................... 202010942583.5

(51) Int. Cl.
*A61C 1/05*    (2006.01)
*A61C 1/12*    (2006.01)

(52) U.S. Cl.
CPC ............... *A61C 1/055* (2013.01); *A61C 1/12* (2013.01)

(58) Field of Classification Search
CPC ........... A61C 5/05; A61C 5/052; A61C 5/055; A61C 5/057; A61C 1/12; A61C 1/08;

(Continued)

(56) References Cited

U.S. PATENT DOCUMENTS 3,469,318 A * 9/1969 Saffir ...................... A61C 1/05
                                                          433/132
4,566,849 A * 1/1986 Flink ....................... B24B 47/14
                                                          415/92

(Continued)

FOREIGN PATENT DOCUMENTS

CN    110301989 A    10/2019
DE    4319084 A1 * 12/1993  ............. A61C 1/052

(Continued)

OTHER PUBLICATIONS

Extended European search report of EP application No. 20217512.1 dated Jun. 14, 2021.

(Continued)

*Primary Examiner* — Jacqueline T Johanas
*Assistant Examiner* — Shannel Nicole Belk
(74) *Attorney, Agent, or Firm* — Andrew C. Cheng

(57) ABSTRACT

A fluid-driven medical or dental handheld device includes a head, the head including a housing and a impeller rotatably mounted in the housing. The housing defines a receiving chamber for receiving the impeller, a main air inlet and an air outlet being defined in the housing and communicating with the receiving chamber. An inner surface of the housing surrounding the receiving chamber defines a plurality of grooves, the grooves being arranged at intervals along a circumferential direction of the housing. The grooves reflect rotating airflows directed to the grooves to change directions and speeds of the airflows to form interference airflows, which can effectively reduce the rotation speed of the head at idling, while ensuring the torque output of the head during grinding teeth.

9 Claims, 4 Drawing Sheets

(58) Field of Classification Search
CPC .. A61C 1/00; A61C 1/05; A61C 1/052; A61C 1/055; A61C 1/057; Y10S 415/904; A61B 2017/00544
See application file for complete search history.

(56) References Cited

U.S. PATENT DOCUMENTS

| | | | | |
|---|---|---|---|---|
| 2001/0002975 | A1* | 6/2001 | Hashimoto | A61C 1/05 433/132 |
| 2002/0119420 | A1* | 8/2002 | Bailey | A61C 1/052 433/132 |
| 2004/0018467 | A1* | 1/2004 | Tanaka | A61C 1/05 433/132 |
| 2007/0281273 | A1* | 12/2007 | Turner | A61C 1/05 433/132 |
| 2011/0104636 | A1* | 5/2011 | Takashi | A61C 1/12 433/132 |

FOREIGN PATENT DOCUMENTS

| | | |
|---|---|---|
| EP | 0974308 A1 | 1/2000 |
| JP | 2003325546 A | 11/2003 |
| WO | 2004056279 A2 | 7/2004 |

OTHER PUBLICATIONS

Search report of TW application No. 110101333 dated Jun. 21, 2021.
JP Office Action of JP application No. 2021-006143 dated Dec. 14, 2021.

* cited by examiner

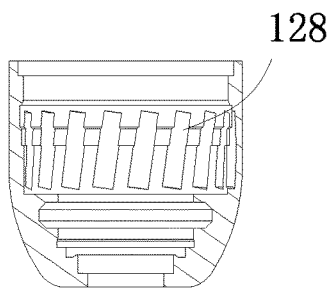
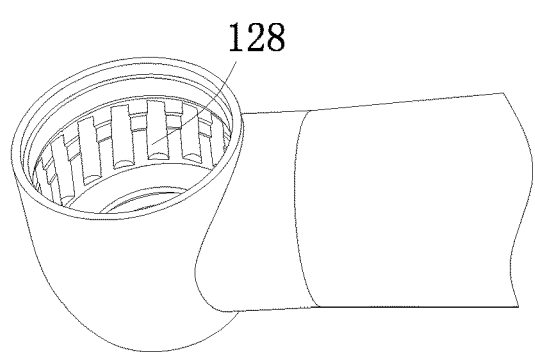
Fig. 7A　　　　　　　　　　Fig. 7B
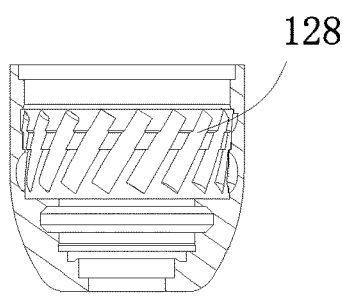
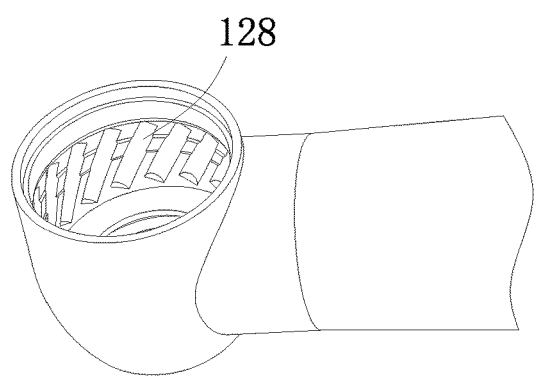
Fig. 8A　　　　　　　　　　Fig. 8B
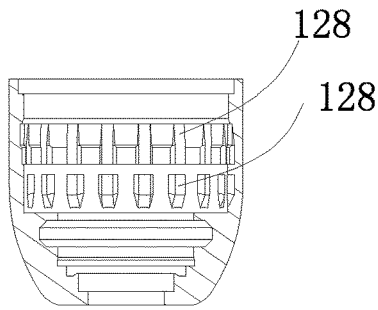
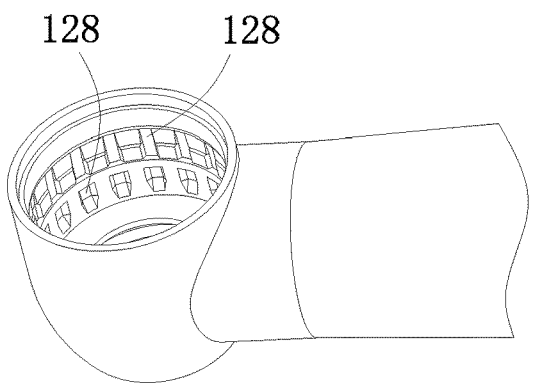
Fig. 9A　　　　　　　　　　Fig. 9B

FLUID-DRIVEN MEDICAL OR DENTAL HANDHELD DEVICE

FIELD OF THE INVENTION

The present disclosure relates to the technical field of medical devices, and in particularly to a fluid-driven medical or dental handheld device.

BACKGROUND OF THE INVENTION

Turbine handpieces include an impeller that is rotated by compressed fluid such as air to generate power, which are usually used for grinding teeth, etc. Generally, a rotation speed of a head of the turbine handpiece for grinding is about 200,000 rpm to ensure that the head can generate enough torque when grinding teeth, so as to prevent the head from being stuck or rotating too low, which affects a work efficiency.

However, in order to ensure the rotation speed of the turbine handpiece for grinding, a no-load rotation speed of the head can be as high as 300,000~450,000 rpm, which may greatly reduce the service life of a bearing of the head. For this reason, high-quality high-speed bearings are adopted in the industry to withstand the high rotation speed of the head to increase the service life of the bearings. However, the high-speed bearings are expensive, which greatly increases the cost. It is also possible to reduce the rotation speed of the head and thus increase the service life of the bearing by limiting a flow speed of the compressed air at a main air hole of the head by limiting a pressure at the main air hole. However, this may make the torque of the head insufficient, which may affect the doctor's work.

SUMMARY OF THE INVENTION

The present disclosure is directed to a fluid-driven medical or dental handheld device which can solve at least one of the above problems.

In one aspect, a fluid-driven medical handheld device is provided which comprises a head, the head comprising a housing and an impeller rotatably mounted in the housing. The housing defines a receiving chamber for receiving the impeller. A main air inlet and an air outlet are defined in the housing and communicate with the receiving chamber. An inner surface of the housing surrounding the receiving chamber defines a plurality of grooves, the grooves being arranged at intervals in the circumferential direction of the housing.

In one embodiment, in the circumferential direction of the surface surrounding the receiving chamber, the grooves are distributed between the main air inlet and the air outlet; a circumferential distance between grooves as a whole and the main air inlet is greater than a circumferential distance between the grooves as a whole and the air outlet.

In one embodiment, a number of the grooves is 3-150.

In one embodiment, an arc length between centers of any two neighboring grooves in the circumferential direction is equal to or less than half of a circumference.

In one embodiment, a recessed depth of the groove relative to the inner surface surrounding the receiving chamber along the radial direction is equal to or less than 1.0 mm.

In one embodiment, an axial length of the groove is less than 10 mm, and each groove is a continuous or intermittent straight groove and parallel to the axis of the housing.

In one embodiment, an axial length of the groove is less than 10 mm, and each groove is a continuous or intermittent chute groove and inclined at an angle relative to the axis of the housing.

In one embodiment, an axial length of the grooves is less than 10 mm, and each groove is a spiral groove extending spirally along the surface surrounding the receiving chamber.

In one embodiment, a radial cross section of the groove is arc-shaped, parabola-shaped, triangle-shaped, trapezoid-shaped or irregular-shaped.

In one embodiment, a surface surrounding the groove is arc-shaped, and has an arc radius being greater than a radial depth of the groove.

In the fluid-driven medical handheld device of the present disclosure, grooves are defined in the inner surface of the housing surrounding the impeller, the grooves reflect rotating airflows directed to the grooves to change directions and speeds of the airflows to form interference airflows, which can effectively reduce the rotation speed of the head at idling, while effectively ensuring the torque output of the head during grinding teeth.

BRIEF DESCRIPTION OF THE DRAWINGS

FIGS. 7A-9B show different forms of the grooves.

DETAILED DESCRIPTION OF THE PREFERRED EMBODIMENTS

Figure 1:
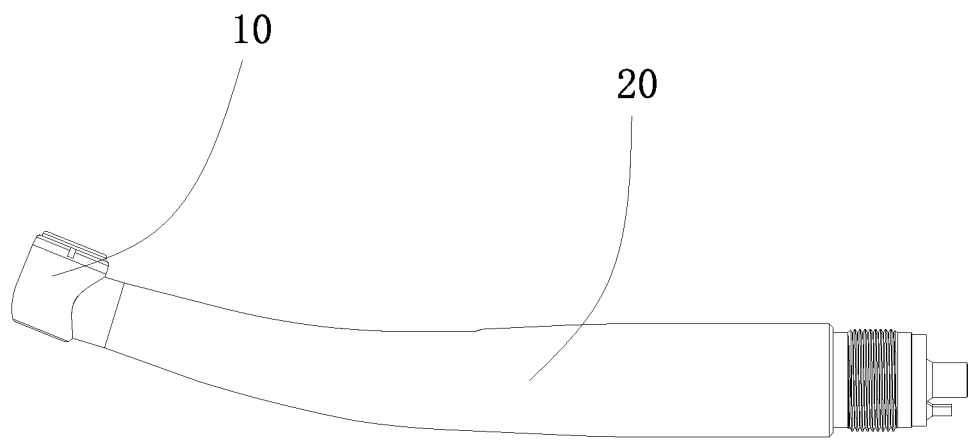
FIG. 1 is a schematic view of a fluid-driven medical handheld device according to an embodiment of the present disclosure.

In order to facilitate understanding of the present invention, the present invention will be described more fully below with reference to the relevant drawings. One or more embodiments of the present invention are exemplarily shown in the drawings, so as to make the understanding of the technical solutions disclosed in the present invention more accurate and thorough. However, it should be understood that the present invention can be realized in a variety of different forms and is not limited to the embodiments described below.

As shown in FIG. 1, a fluid-driven medical or dental handheld device according to an embodiment of the present invention includes a head 10 and a handle 20 connected to the head 10. The handle 20 is convenient for users, such as doctors, to hold. Please also referring to FIG. 2 and FIG. 3, the head 10 includes a housing 12, a cover 14 connected to the housing 12, a central shaft 16 rotatably arranged in the housing 12, and an impeller 18 mounted around the central shaft 16. As shown in FIG. 4, the housing 12 as a whole is cylindrical-shaped, with a shaft hole 120 extending therethrough. One axial end of the shaft hole 120 of the housing 12 is closed by the cover 14. The central shaft 16 is rotatably disposed in the shaft hole 120. One end of the central shaft 16 is supported by the cover 14, and the other end of the central shaft 16 extends through and out of the other axial end of the housing 12. The impeller 18 is fixedly sleeved on the central shaft 16. Once rotated by a compressed fluid such as a compressed air, the impeller 18 drives the central shaft 16 to rotate synchronously. The impeller 18 and the central shaft 16 can be connected by tight fit, keyed fit, snap fit, etc.

An axial middle portion of an inner surface of the housing 12 is recessed in the radial direction to form a receiving chamber 122, and the receiving chamber 122 surrounds the shaft hole 120. The impeller 18 is arranged in the receiving chamber 122. Please also referring to FIG. 2, the diameter of the impeller 18 is slightly less than the diameter of the receiving chamber 122. After the impeller 18 is assembled into the housing 12, an outer edge of the impeller 18 and an inner surface 123 of the housing 12 surrounding the receiving chamber 122 are spaced from each other in the radial direction. A flow channel 125 is formed between the inner surface 123 and the impeller 18 and surrounds the impeller 18. Preferably, the inner surface of the housing 12 is recessed in the radial direction at both axial sides of the receiving chamber 122 to form an accommodating space 124 surrounding the shaft hole 120, respectively. Each accommodating space 124 is provided with a bearing 19 to support the central shaft 16 for high-speed rotation. Preferably, the bearing 19 is a ball bearing, and a sealing ring 11 is arranged between a radial outer face of the bearing 19 and the inner surface of the housing 12.

Figure 2:
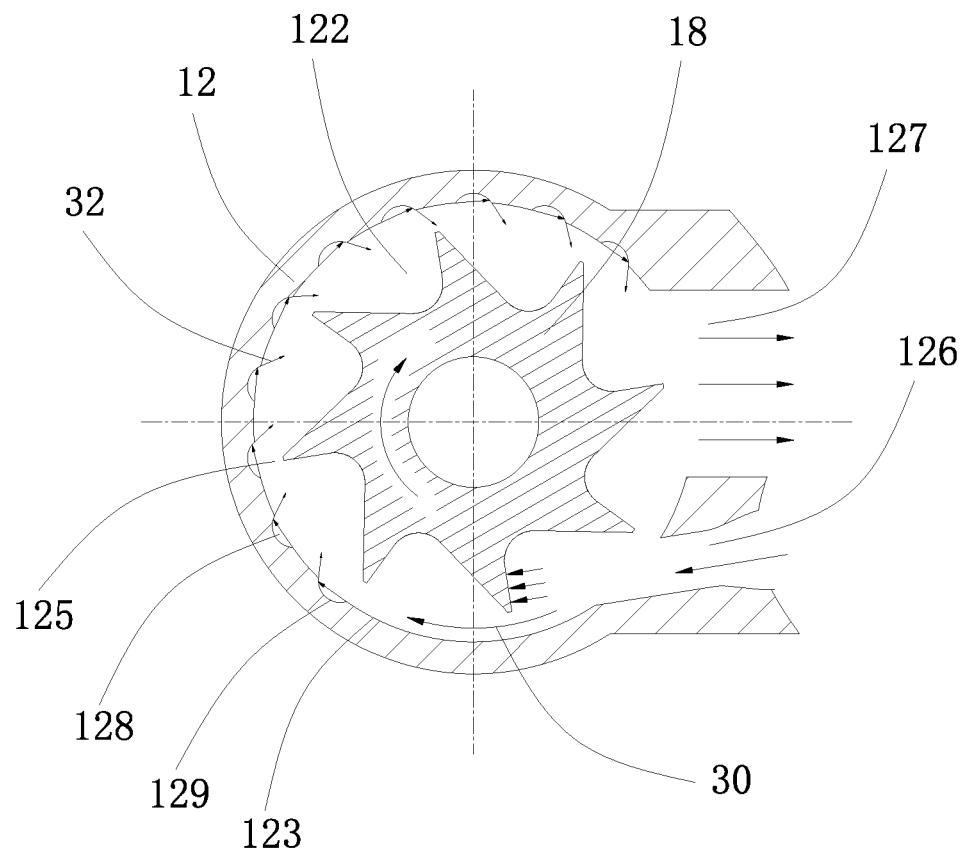
FIG. 2 is a radial cross-sectional view of the fluid-driven medical handheld device shown in FIG. 1, in which arrows indicate flowing directions of internal airflows.
Figure 4:
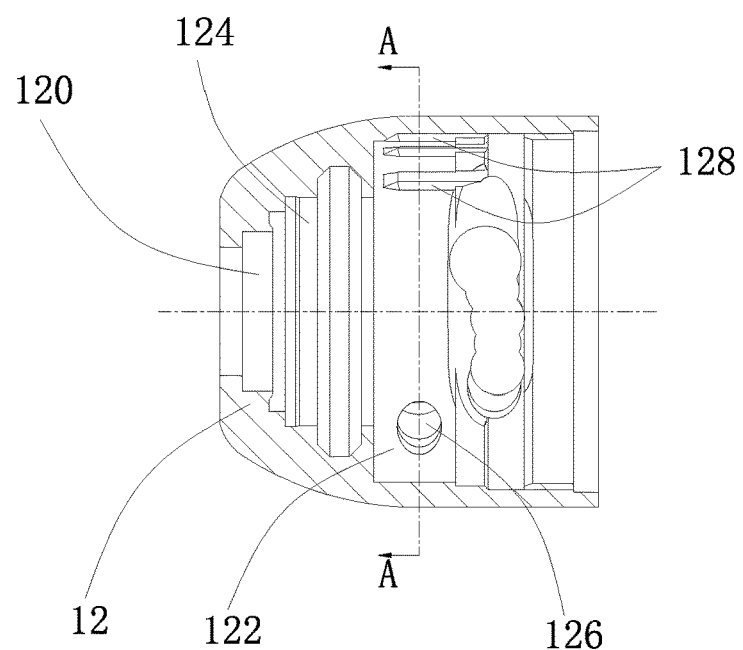
FIG. 4 is an axial cross-sectional view of a housing of a head of the fluid-driven medical handheld device shown in FIG. 1.
Figure 5:
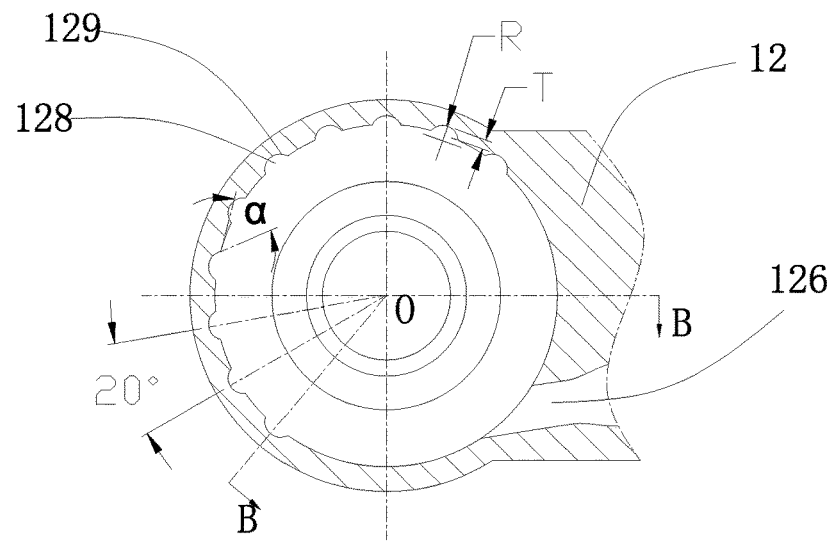
FIG. 5 is a cross-sectional view of the housing of FIG. 4, taken along line A-A thereof.
Figure 6:
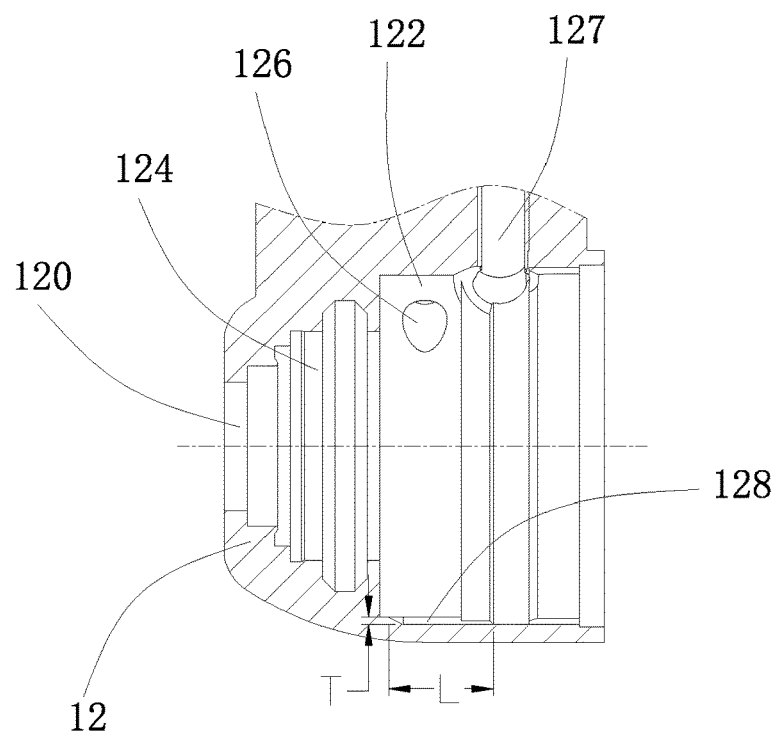
FIG. 6 is a cross-sectional, unfolded view of the housing of FIG. 5, taken along line B-O-B thereof.

Please also referring to FIGS. 4-6, the housing 12 defines a main air inlet 126 and an air outlet 127, the main air inlet 126 and air outlet 127 communicate with the receiving chamber 122, for inflow and outflow of compressed air, respectively. In this embodiment, the main air inlet 126 and the air outlet 127 are formed at a position where the housing 12 and the handle 20 are connected, and aligned with the impeller 18 in the housing 12. The compressed air enters into the receiving chamber 122 of the housing 12 through the main air inlet 126, and then flows towards the air outlet 127 along the flow channel 125 between the impeller 18 and the surface 123 surrounding the receiving chamber 122 (flowing clockwise as shown in FIG. 2) to form rotating airflows 30, and finally flows through the air outlet 127 to the outside. When the rotating airflows 30 flow through the housing 12, the impeller 18 is driven to rotate and in turn drive the central shaft 16 to rotate clockwise. In other embodiments, the compressed air may also form rotating airflows that flow counter-clockwise, driving the impeller 18 and the central shaft 16 to rotate counter-clockwise.

Figure 3:
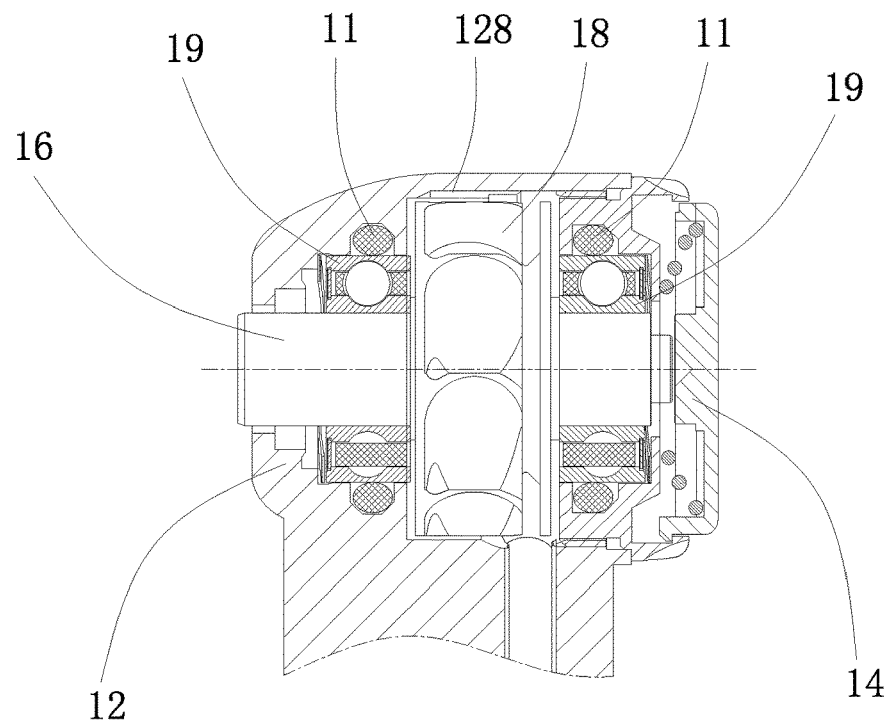
FIG. 3 is an axial cross-sectional view of the fluid-driven medical handheld device shown in FIG. 1.

As shown in FIG. 2 and FIG. 3, a plurality of grooves 128 is defined in the inner surface 123 of the housing 12 surrounding the receiving chamber 122. In the illustrated embodiment, these grooves 128 are recessed from the surface 123 in the radial direction. A recessed depth T of the groove 128 relative to the surface 123 in the radial direction is far less than a thickness of the housing 12 in the radial direction. In other words, the grooves 128 are blind grooves that do not penetrate the housing 12. The recessed depth T of the groove 128 in the radial direction is not greater than 1.0 mm, preferably is 0.1-0.5 mm. The groove 128 can have various shapes, for example, a cross section of the groove 128 in the radial direction can be arc-shaped, trapezoid-shaped, triangle-shaped, irregular-shaped, etc. In this embodiment, the cross section of each groove 128 is arc-shaped, and the radius R of the arc is 0.5 mm. The recessed depth T of the groove 128 relative to the surface 123 is less than the radius R, and the maximum recessed depth T is 0.3 mm.

Each groove 128 extends along a direction parallel to the axial direction of the housing 12, an axial length of the groove 128 is similar to an axial height of the impeller 18, and the groove 128 aligns with the impeller 18 in the radial direction. Preferably, an axial length L of the groove 128 is less than 10 mm. In this embodiment, the groove 128 is continuous, straight groove, and is parallel to the axial direction of the housing 12, and the axial length L of the groove 128 is about 3 mm. In other embodiments, the grooves 128 can also be chute grooves inclined at an angle relative to the axis of the housing 12 (see FIG. 7A and FIG. 7B), or can also be spiral grooves extending spirally along the surface 123 surrounding the receiving chamber 122 (see FIG. 8A and FIG. 8B). In addition, in other embodiments, each of the grooves 128 may also be intermittent grooves (see FIG. 9A and FIG. 9B).

The grooves 128 are arranged sequentially from the main air inlet 126 to the air outlet 127 in the circumferential direction of the inner surface of the housing 12, and a number of the grooves 128 is preferably 3-150. In order to increase an interference effect to the compressed air, an arc length between the centers of any two neighboring grooves 128 in the circumferential direction is not greater than half of a circumference. As shown in FIG. 5, in this embodiment, the number of the grooves 128 is ten, and the grooves 128 are evenly spaced from each other. Along the flowing direction, the first groove 128 has a certain distance from the main air inlet 126 in the circumferential direction, and the last groove 128 is relatively closer to the air outlet 127 in the circumferential direction. In other words, the distance between the first groove 128 and the main air inlet 126 is greater than the distance between the last groove 128 and the air outlet 127. That is, the circumferential distance between the grooves 128 as a whole and the main air inlet 126 is greater than the circumference distance between the grooves 128 as a whole and the air outlet 127. In this embodiment, the arc length of the ten grooves 128 in the circumferential direction of the housing 12 is about half of the circumference, which corresponds to a central angle of 180 degrees; the arc length between the centers of the two adjacent grooves 128 in the circumferential direction is about $\frac{1}{18}$ circumference, corresponding to a center angle of 20 degrees.

Each groove 128 is recessed from the surface 123 of the housing 12 surrounding the receiving chamber 122, and thus a surface 129 surrounding and defining each groove 128 has a curvature different from that of the inner surface 123 surrounding the receiving chamber 122, so that a tangential direction of each point of the surface 129 is different from the tangential direction of the surface 123. In this embodiment, at the junction of the surface 129 surrounding the groove 128 and the surface 123 surrounding the receiving chamber 122, the tangential direction of the surface 129 and the tangential direction of the surface 123 define an angle α therebetween, and the angle α is about 52 degrees. When the compressed air flows along the flow channel 125 in the housing 12, the compressed air flows generally along the surface 123 surrounding the receiving chamber 122, and part of the compressed air flows into the grooves 128 and is reflected at the surfaces 129 defining the grooves 128. As shown in FIG. 2, the compressed air reflected by the grooves 128 not only changes in directions, but also loses energy so that its speed drops, and becomes interference airflows 32.

When the fluid-driven medical handheld device is in use, compressed air enters the receiving chamber 122 of the head 10 through the main air inlet 126, and flows along the flow channel 125 between the impeller 18 and the inner surface 123 surrounding the receiving chamber 122 at a high speed, forming rotating airflows 30 to drive the impeller 18 and in turn drive the central shaft 16 to rotate at a high speed. Since grooves 128 are defined in the surface 123 and surround the impeller 18, part of the rotating airflows 30 enter the grooves 128 while flowing along the surface 123 and are reflected by the grooves 128, forming interference airflows 32 with inconsistent directions and speeds. The interference airflows 32 retard the high-speed rotation of the impeller 18 thus reducing the rotation speed of the impeller 18. The greater the number of the grooves 128 is, the more the interference airflows 32 are formed, and the more obvious the speed reduction is caused to the wind wheel 18. In addition, the higher the speed of the rotating airflow 30 is, the greater the influence is caused by the interference airflows 32, and the obvious the speed reduction is caused to the wind wheel 18.

To ensure that the fluid-driven medical handheld device can generate sufficient torque when grinding teeth, the flowing speed or air pressure of the compressed air at the main air inlet 126 should be increased as much as possible, so that the impeller 18 can obtain a greater driving force. When the fluid-driven medical handheld device is idling, there is no load on the impeller 18, the rotation speed of the impeller 18 is thus relatively higher, which can theoretically be as high as 300,000 to 450,000 rpm. Due to the influence of the interfering airflows 32 formed by the grooves 128 on the rotating airflows 30, rotation of the impeller 18 is retarded, such that the actual idling speed (or no-load speed) of the fluid-driven medical handheld device can be significantly reduced, thereby prolonging the service life of the bearing 19. When the handheld fluid-driven medical equipment is grinding teeth, the rotation speed of the impeller 18 will be reduced to about 200,000 rpm due to the load. At this time, the rotation speed of the impeller 18 is much lower than that of the rotating airflows 30. The influence of the interference airflows 32 formed by the grooves 128 on the impeller 18 is nearly negligible when the rotation speed of the impeller 18 has already been reduced to about 200,000 rpm by the load, which ensures that the handheld fluid-driven medical equipment outputs sufficient torque, and prevents the head 10 from being stuck or rotating too low, ensuring the working efficiency of the handheld fluid-driven medical equipment of the present invention.

The handheld fluid-driven medical equipment of the present invention is provided with grooves 128 in the surface 123 of the housing 12 surrounding the impeller 18, the rotating airflows 30 directed to the groove 128 are reflected, causing the change in directions and speeds to form interference airflows 32. The interference airflows 32 cause obvious interference to the impeller 18 when the head 10 is idling, effectively reduce the speed of the impeller 18, and prolong the service life of the bearing 19. At the same time, the rotation speed of the impeller 18 will be significantly reduced when the head 10 is affected by the load during grinding teeth. During grinding the teeth, the influence of the interference airflows 32 on the impeller 18 is far less than that of the load on the impeller 18. Therefore, the interference airflows 32 basically does not affect the rotation speed of the machine head 10 when grinding teeth, and sufficient torque output can thus be ensured. With the provision of the grooves 128, the present invention can effectively reduce the rotation speed at idling, thus prolonging the service life of the bearing 19, while ensuring the torque output during grinding. The grooves 128 can be formed by reciprocating motion of shaping tools which are operated by CNC lathes, or can be formed by milling cutters driven by power heads which are operated by CNC lathes with milling function, which is simple in manufacturing process and basically does not affect the overall cost.

Those described above are merely preferred embodiments of the present invention and should not be used to limit the present invention. Any modifications, equivalent substitutions and improvements made without departing from the spirit and principle of the present invention should be integrated to fall within the scope of the present invention.

The invention claimed is:

1. A fluid-driven medical handheld device, comprising a head (10), the head (10) comprising a housing (12) and an impeller (18) being rotatably mounted in the housing (12), the housing (12) defining a receiving chamber (122) for receiving the impeller (18), a main air inlet (126) and an air outlet (127) being defined in the housing (12) and communicating with the receiving chamber (122), wherein an inner surface (123) of the housing (12) surrounding the receiving chamber (122) defines a plurality of grooves (128), the grooves (128) being arranged at intervals in a circumferential direction of the housing (12) and configured to reflect part of the rotating airflows entering the grooves (128) to thereby form interference airflows (32) to reduce rotation speed of the impeller (18); wherein a recessed depth of the groove (128) relative to the inner surface (123) surrounding the receiving chamber (122) along the radial direction is equal to or less than 1.0 mm.

2. The fluid-driven medical handheld device of claim 1, wherein in the circumferential direction of the inner surface (123) surrounding the receiving chamber (122), the grooves (128) are distributed between the main air inlet (126) and the air outlet (127), a circumferential distance between the grooves (128) as a whole and the main air inlet (126) is greater than a circumferential distance between the grooves (128) as a whole and the air outlet (127).

3. The fluid-driven medical handheld device of claim 1, wherein a number of the grooves (128) is 3-150.

4. The fluid-driven medical handheld device of claim 1, wherein an arc length between centers of any two neighboring grooves (128) in the circumferential direction is equal to or less than half of a circumference of the housing (12).

5. The fluid-driven medical handheld device of claim 1, wherein an axial length of the groove (128) is less than 10 mm, and each groove (128) is a continuous or intermittent straight groove and parallel to the axis of the housing (12).

6. The fluid-driven medical handheld device of claim 1, wherein an axial length of the groove (128) is less than 10 mm, and each groove (128) is a continuous or intermittent chute groove and inclined at an angle relative to the axis of the housing (12).

7. The fluid-driven medical handheld device of claim 1, wherein an axial length of the grooves (128) is less than 10 mm, and each groove (128) is a spiral groove extending spirally along the surface (123) surrounding the receiving chamber (122).

8. The fluid-driven medical handheld device of claim 1, wherein a radial cross section of the groove (128) is arc-shaped, parabola-shaped, triangle-shaped, or trapezoid-shaped.

9. The fluid-driven medical handheld device of claim 1, wherein a surface (129) surrounding and defining each groove (128) is arc-shaped, and has an arc radius being greater than a radial depth of the groove (128).

\* \* \* \* \*